May 1, 1951 R. N. ANDERSON 2,551,231
FRAME FOR COUPLING TWO TRACTORS IN LATERALLY SPACED
RELATION AND FOR MOUNTING THE
TRACTOR CONTROLS THEREON
Filed Dec. 2, 1948 3 Sheets-Sheet 2
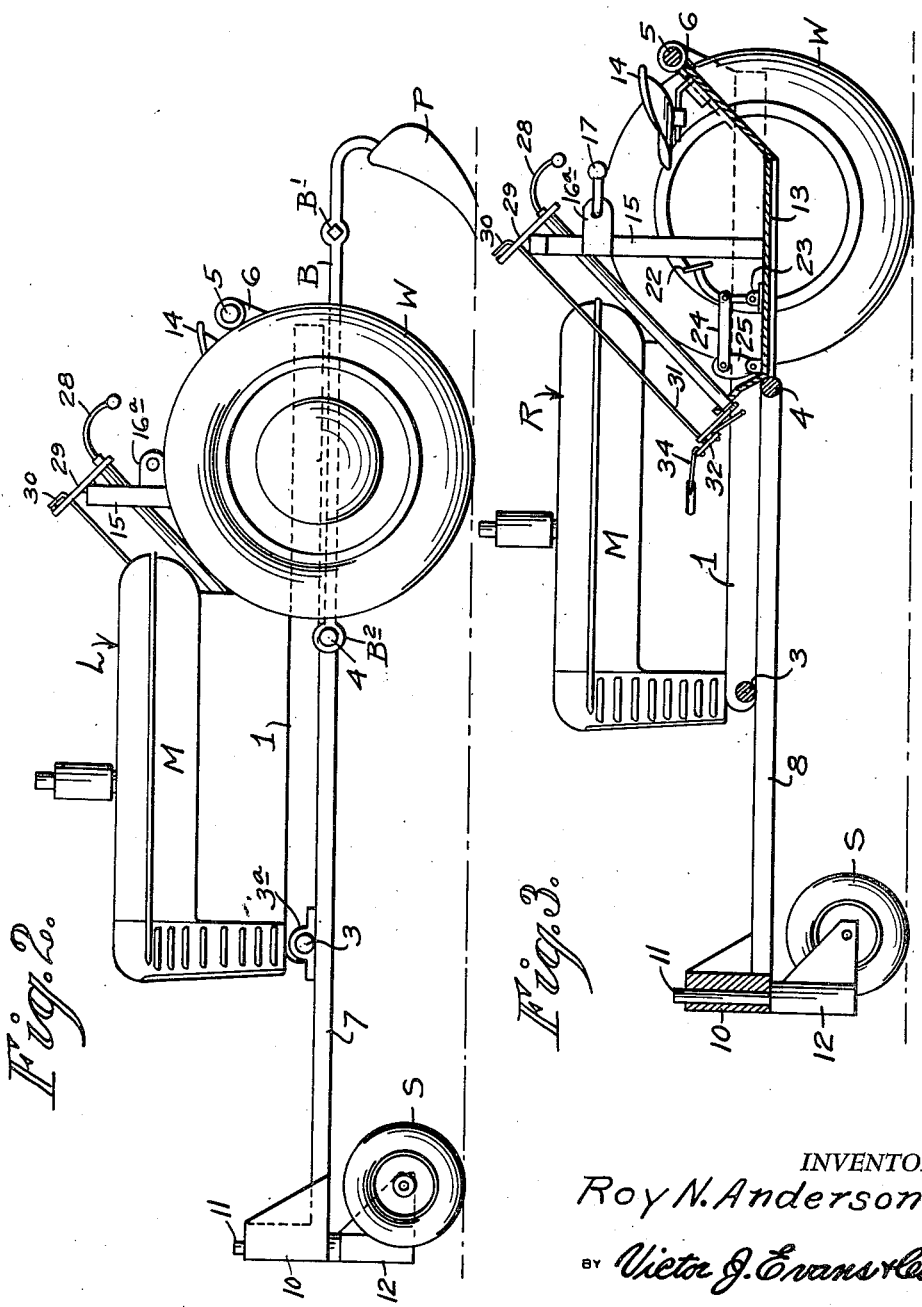
INVENTOR.
Roy N. Anderson
BY Victor J. Evans & Co.
ATTORNEYS

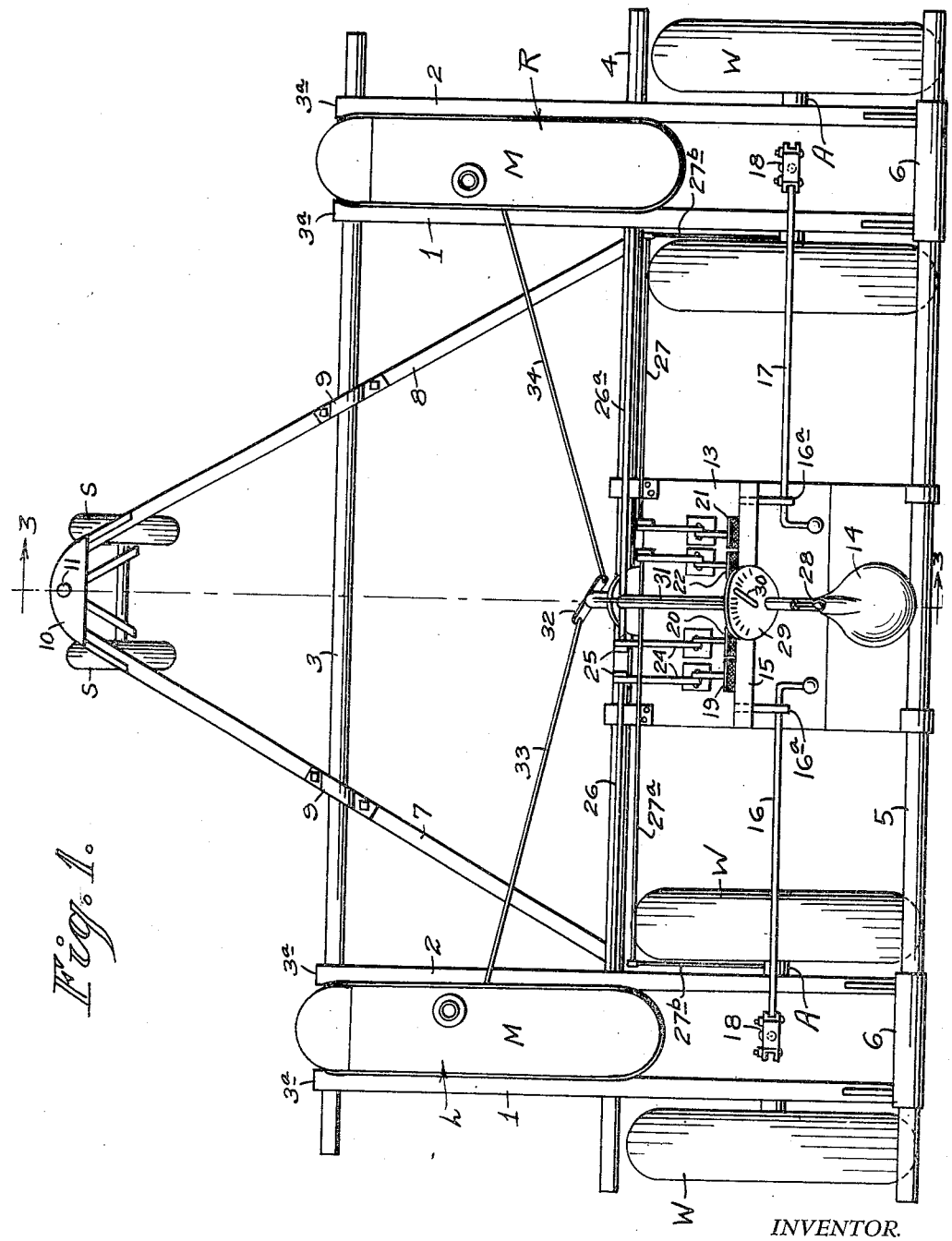

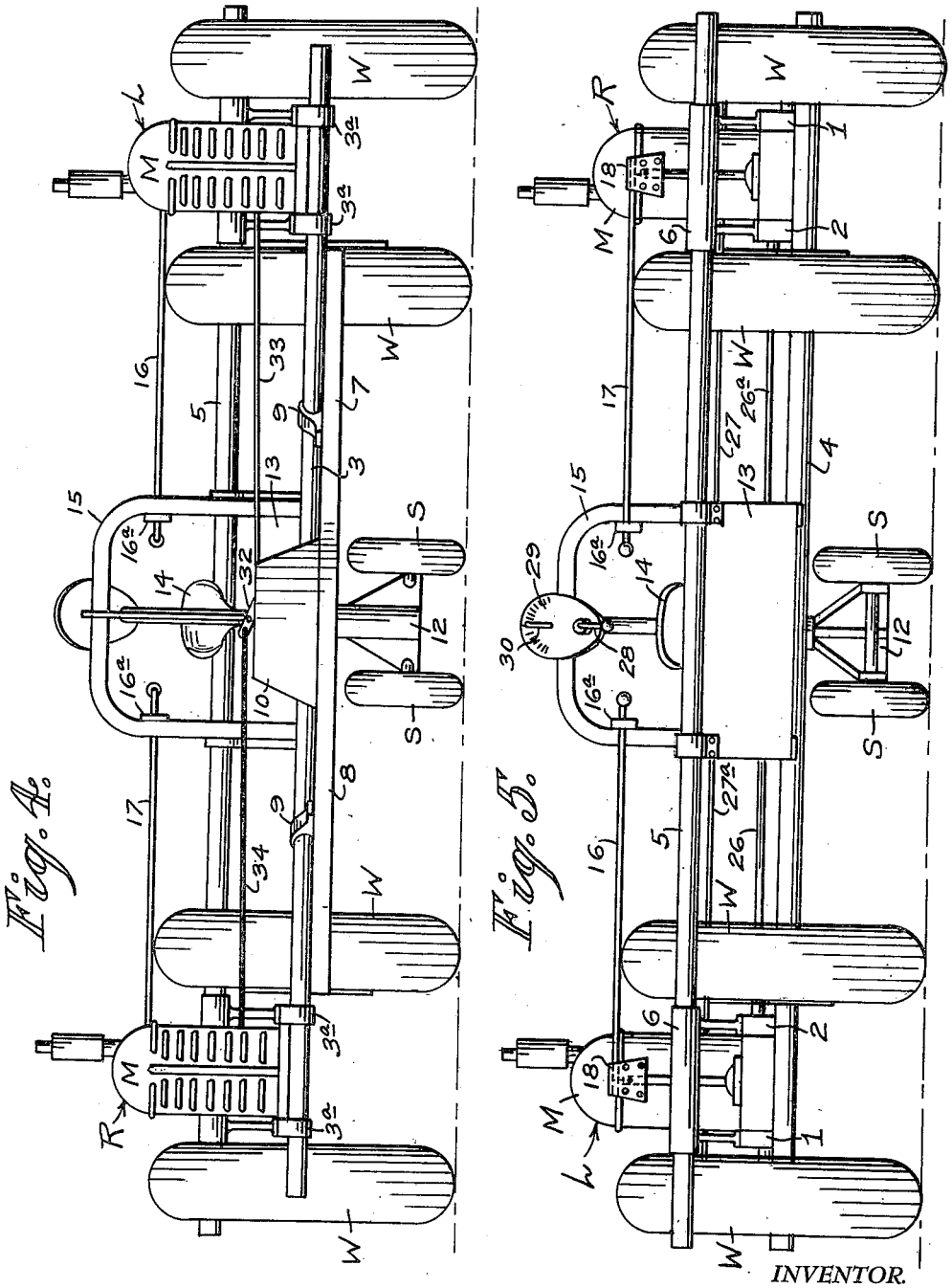

Patented May 1, 1951

2,551,231

UNITED STATES PATENT OFFICE 2,551,231

FRAME FOR COUPLING TWO TRACTORS IN LATERALLY SPACED RELATION AND FOR MOUNTING THE TRACTOR CONTROLS THEREON

Roy N. Anderson, Grier, N. Mex.

Application December 2, 1948, Serial No. 63,111

1 Claims. (Cl. 180—6.48)

My invention, a tractor coupler, relates to the coupling together of two of the general class of motor vehicles of the wheeled or track type tractors of various sizes with single or dual wheels or tracks.

In the accompanying drawings of my tractor coupler I show two medium sized wheeled type tractors with dual traction wheels. My tractor coupler having a central control station for pedals, shifting levers, and throttle or governor control of the propulsion and steering by driving of the dual tractors.

In carrying out my invention I employ two laterally spaced and standard tractor units each having dual traction wheels and these units are coupled together in a unitary structure or implement and provided with a front swiveled caster wheel truck for cooperation with the dual tractors as they are controlled for steering by driving.

The primary objects of my invention, the tractor coupler, are the provision of a coupler for automotive vehicles or tractors; that (1) make it possible for one man to operate two tractors; (2) provide distribution of power over a wide area; and permit ease of operation and unobstructed view of the work. While adapted for various purposes and uses, it is especially designed for propelling agricultural implements such as gang plows, planters, cultivators, harrows and other standard implements that work in or form rows and furrows in the soil. For this purpose the wheels of each unit are laterally spaced to straddle a row. The tractor unit is laterally spaced in predetermined relation to the furrows to be opened, and the agriculture implement (as a gang of plows) is related to the propelling dual tractor in order that the multiple plows will open the furrows in parallel rows.

The main coupling frame of the dual tractor coupler may be made of tubular steel and varied in width and size to increase or decrease the accommodations for multiple plows, cultivators, or harrows, depending on the horsepower rating of the dual tractors and the tractor coupler is equipped with controls that may readily be manipulated by the driver for steering by driving of the dual tractors.

The invention includes a minimum number of parts that can be manufactured with facility and low cost of production and the parts may be readily assembled to unite the tractor units into a unitary structure that insures a stabilized traction implement that is free from lateral pulling or swaying, and the travel of the individual unit is synchronized and controlled by steering, by driving, by the driver at predetermined set speeds of the governors on the motors.

My invention, or tractor coupler, consists of certain novel features of construction, combinations and arrangements of parts as will hereinafter be described and more particularly set forth in the appended claim.

In the accompanying drawings I have illustrated a complete example of a physical embodiment of my invention, or tractor coupler. It will, however, be understood that changes and alterations are contemplated and may be made in the exemplifying drawings and mechanical structures, within the scope of my claim, to make my invention, for tractor coupler, adaptable to the various sizes and types of wheeled or track type tractors, without departing from the principles of the invention, or tractor coupler.

I have suggested as one mode for the practical application of the principles of my invention, or tractor coupler, a gang of plows for opening five parallel furrows. I further suggest that various other types of standard agricultural implements may be substituted for the plows and the hitches and drawbars shall be so arranged to handle the standard implements.

Figure 1 is a top plan view of a dual tractor embodying my invention and adapted for use of gang plows in opening five parallel furrows. Figure 2 is a left side view in elevation of the implement in Figure 1 showing a plow beam and one of the plows. Figure 3 is a vertical longitudinal sectional view of the implement at line 3—3 of Figure 1.

Figure 4 is a view in front elevation of the tractor coupler or implement for dual tractors, and Figure 5 is a view in rear elevation of the implement embodying my invention.

In the several views two standard two-wheel tractors or tractor-units are designated as R for the right hand unit and L as the left hand unit, each equipped with a typical motor M, and the pairs of wheels, W, W, are laterally spaced to straddle a row, with space between the inner adjoining wheels for three more rows or furrows.

The front end of the implement is supported by a pair of front wheels S that coact with the dual traction wheels W of the units for this purpose, and the driving axle A of the units are controlled in their rotation of the two sets of wheels for steering by driving in well known manner.

The wheels support a main frame that includes two laterally spaced, horizontal, and longitudinally extending tractor frames each of which includes spaced parallel plates 1 and 2 upon which the motors M are rigidly mounted and these tractor frames are supported on the respective axles A of the dual pairs of wheels.

These longitudinally extending tractor frames are laterally adjusted and supported on three transversely tubular steel bars, of which the front cross bar 3 is located beneath the front end of each tractor-unit with its opposite ends extending through bearings 3a of the tractor-unit frame. An intermediate cross bar 4 located in front of the traction wheels W passes through and is connected with the plates 1 and 2 of the respective tractor-unit frames; and this cross bar is employed as a hitch for the gang plow P that are mounted in a carriage including the plow beams B and cross beam B1, the carriage being mounted in the bar 4, as at B2 in Figure 2.

The tractor-unit frames are connected by a third cross bar 5 at the rear of the wheels W and this rear bar, which may be utilized in supporting the plow carriage, is supported in the elevated position in brackets 6, 6, rigidly mounted at the rear ends of the plates 1 and 2 of the respective tractor-unit frames.

The longitudinal tractor-unit frames and the transverse bars 3, 4 and 5 provide a rigid main frame for the dual tractor, and the front or forward portion of the main frame or coupling frame is provided with a pair of converging radius rods 7 and 8 having their rear ends connected with the cross bar 4, coupled at 9 with the front cross bar 3, and the converging ends of the radius rods are firmly affixed to an upright bearing head 10. The bearing head 10 supports the stem or spindle 11 of the swiveled truck 12 in which the two caster wheels S, S, are journaled, and the front portion of the dual tractor is supported on the wheels S with the rear portion of the weight of the dual implement supported on the traction wheels W.

As thus shown and described the longitudinal tractor-unit frames may laterally be adjusted on the transversely extending, or cross bars, to vary with width of the implement in adapting it for installation with gang plows having variable multiples of plows.

For the driver who controls the propulsion, and the steering by driving, of the automotive implement, a control floor, deck, or platform 13 as supported between the dual pairs of wheels W in position where the driver occupying the seat 14 can readily observe the operation of the implement, and the field in which the implement is working.

The deck 13 is supported at its front end on cross bar 4 and at its rear end on the cross bar 5, and an upright arch frame 15 is mounted on the deck in which operating and control parts are mounted in convenient and readily accessible position for the use of the driver.

Each of the tractor units is equipped with the standard gear-shifting mechanism and each unit is provided with a manually operated lever, as 16 and 17, journaled in bearings 16a of the frame 15; and these levers extend laterally in opposite directions to operative connections 18, 18, of the respective units and their gear shifting mechanisms.

The dual sets of traction wheels are equipped with standard clutching mechanisms that are separately controlled by the clutch pedals 19 and 20; and the respective brake mechanisms of the two sets of wheels are controlled by pedals 21 and 22. The pedals are located in position in front of the seat, and pivoted at 23 on the deck, with links 24 and cranks 25; the clutch pedals 19 and 20 being connected by rods 26 and 26a respectively, with the left hand and right hand clutch mechanisms.

The brake pedals 21 and 22 are connected by transverse rods 27 and 27a with longitudinally extending rods 27b that are operatively connected with the braking mechanism of the wheels W.

For governing the speed of the motors and the travel of the tractor-units, a centrally arranged throttle lever 28 is provided, and equipped with a dial plate 29 and indicator 30 which shows the operating positions of the throttles of the motors. The respective throttles are synchronized and manually controlled by the hand lever 28, through a rock shaft 31 journaled in a housing, and a crank arm 32 on the rock shaft, from which crank arm two oppositely extending and transversely arranged links 33 and 34 project to the motors and their throttle mechanisms.

By means of the throttle or governor control lever 28, which is readily accessible to the driver of the dual tractor, for right hand and left hand swinging movements, the throttle of one tractor unit may be opened while the other throttle is closed, thereby changing the traveling speed of the tractor units, for steering by driving the automotive vehicle; and of course the throttles may readily be adjusted for straight ahead travel of the vehicle.

The two tractor-unit frames, each composed of the plates 1 and 2 form the draw bars for the tool carriage that is hitched or coupled to the central cross bar 4 and supported from and below the rear cross bar 5, and it will be understood that other tool carriages may be substituted for the gang plow carriage herein illustrated for different standard implements for cultivating the soil.

For changing the width of a strip of land to be cultivated and decreasing or increasing the number of tools, as plows, to be employed, the tractor-units may be spaced laterally with relation to the coupling frame, and the control mechanisms extending from the deck to the tractor unit may be extended or retracted as required.

Having thus fully described my invention, what I claim as new and desire to secure by Letters Patent is:

In a tractor coupler for coupling together for unitary control a pair of tractors the combination of a main frame comprising, plate members attached to the opposite sides of each tractor, a pair of rear traction wheels operatively supporting the plates on each tractor, a motor for driving each pair of traction wheels mounted on the plate members, control means for controlling the speed of the motor and thereby each tractor, bearing members on the forward ends of the plate members, a front cross bar mounted in said bearing members, an intermediate cross bar mounted in the plate members in front of the traction wheels, a rear cross bar mounted in the plate members at the rear of the traction wheels, and said bars permit relative lateral adjustment of each tractor to change the laterally relative spacing of the tractors, a pair of converging radius rods connected at their rear ends to said intermediate cross bar and to said front cross bar intermediate of their ends, a bearing head secured to the front ends of said radius rods adjacent their point of convergence, a truck swiveled to said bearing head, castor wheels adapted to transverse the ground journalled on said truck, a platform intermediate the plate members and supported by said intermediate and rear cross bars, an upright arch frame extending upwardly from said platform and control mechanism extending from said upright arch frame to the respective tractors and connected to the respective control means thereof for controlling the respective speed of the respective tractors for steering and driving purposes.

ROY N. ANDERSON.

REFERENCES CITED

The following references are of record in the file of this patent:

UNITED STATES PATENTS

| Number | Name | Date |
| --- | --- | --- |
| 1,158,680 | Griffin | Nov. 2, 1915 |
| 1,310,604 | Burgess | July 22, 1919 |
| 1,430,251 | Parker | Sept. 26, 1922 |
| 1,798,351 | Pederson et al. | Mar. 31, 1931 |
| 2,168,706 | George et al. | Aug. 8, 1939 |
| 2,262,877 | Baker | Nov. 18, 1941 |